United States Patent Office 3,637,546
Patented Jan. 25, 1972

3,637,546
THERMOSETTING ACRYLIC ENAMEL CONTAINING CELLULOSE ACETATE BUTYRATE
Fred W. Parker, Flint, Mich., assignor to E. I. du Pont de Nemours and Company, Wilmington, Del.
No Drawing. Continuation-in-part of application Ser. No. 780,190, Nov. 29, 1968. This application Oct. 16, 1970, Ser. No. 81,630
Int. Cl. C03c 7/02; C08b 21/08
U.S. Cl. 260—15
14 Claims

ABSTRACT OF THE DISCLOSURE

A coating composition in which the film-forming polymeric material consists essentially of:
(1) an acrylic polymer of styrene, methyl methacrylate, a soft constituent, such as an alkyl acrylate or an alkyl methacrylate other than methyl methacrylate, a hydroxy containing constituent which is either a hydroxy alkyl acrylate or a hydroxy alkyl methacrylate, and an $\alpha,\beta$-unsaturated monocarboxylic acid;
(2) cellulose acetate butyrate; and
(3) a thermosetting nitrogen containing resin.

The novel coating composition is particularly useful as a high quality finish on automobiles and trucks.

CROSS-REFERENCE TO RELATED APPLICATION

The application is a continuation-in-part application to my copending application Ser. No. 780,190 filed Nov. 29, 1968 and now abandoned.

BACKGROUND OF THE INVENTION

This invention relates to thermosetting acrylic enamels and, in particular, to a thermosetting acrylic enamel that gives a high quality weather resistant coating that is a very useful coating for the exterior of auto and truck bodies.

Thermosetting acrylic coating compositions are well known in the art as shown by Frazier et al. U.S. Pat. 2,681,897, issued June 22, 1954; Vasta U.S. Pat. 3,338,860, issued Aug. 29, 1967; Fisk et al. U.S. Pat. 3,365,414, issued Jan. 23, 1968, and are excellent for many purposes. However, as typical of enamel compositions, spot repair of these enamels is difficult. Generally, the entire panel or door, for example, of an auto must be repainted to obtain an unnoticeable repair.

The novel coating composition of this invention, while it is a cross-linking enamel, can be spot repaired using the same technique as used to repair lacquer coatings, i.e., a solvent mist is applied to soften the damaged coating and the repair coating is applied and then baked to a hard, glossy finish which has the appearance of a lacquer coating. Moreover, the novel coating composition of the invention when dried and fully cured provides a coating that is durable, resistant to weathering and water spotting, resistant to aromatic solvents and is particularly resistant to gasoline. Also, the novel coating can be used in a typical auto production facility where the coating is applied and baked at a relatively low temperature, then sanded and rebaked at a high temperature. The coating will flow to a smooth, even, glossy film that has the appearance of a high quality methacrylate lacquer which has not been possible with conventional cross-linking enamel coatings. Moreover, the novel coating composition of this invention can be applied at substantially higher spray solids than conventional lacquers which provides a thicker film per application and, therefore, one to two coats need only be applied while conventional lacquers require several coats to achieve a comparable film thickness. These characteristics make the novel coating composition of this invention particularly attractive for the exterior finish of auto and truck bodies.

SUMMARY OF THE INVENTION

The liquid coating composition comprises 10–60% by weight of a film-forming polymer blend and a solvent for the polymer blend, in which the polymer blend consists essentially of (1) 50–80% by weight of an acrylic polymer which consists essentially of
 (a) 0–25% by weight styrene,
 (b) 25–55% by weight methyl methacrylate,
 (c) 38–48% by weight of a soft constituent which is either an alkyl acrylate or an alkyl methacrylate in which the alkyl groups have 2–4 carbon atoms,
 (d) 5–20% by weight of a hydroxy containing constituent which is either a hydroxy alkyl acrylate or a hydroxy alkyl methacrylate in which the alkyl groups contain 1–8 carbon atoms, and
 (e) 1–5% by weight of an $\alpha,\beta$-unsaturated monocarboxylic acid;
wherein the acrylic polymer has a relative viscosity of 1.04–1.10 measured at 25° C. in ethylene dichloride according to ASTM D–445–46–T Method B;
(2) 5–50% by weight of cellulose acetate butyrate having a butyryl content of about 45–55% by weight and a viscosity at 25° C. of about 1–6 seconds measured according to ASTM D–1343–56; and
(3) 5–50% by weight of a compatible thermosetting nitrogen containing resin.

DESCRIPTION OF THE INVENTION

Preferably, the novel coating composition of this invention has a polymer solids content of 30–50% by weight and is pigmented and has a pigment volume concentration of about 1–20%.

The acrylic polymer is prepared by conventional polymerization techniques in which the monomer constituents are blended with solvents and a polymerization catalyst and heated to 75–150° C. for about 2–6 hours to form a polymer that has a relative viscosity of about 1.04–1.10 and preferably, about 1.06–1.09. The "relative viscosity" is the value obtained by dividing the efflux time of a solution of the polymer by the efflux time of the solvent used to form the above polymer solution. The efflux times are measured according to the procedure of ASTM D–445–46T, Method B, using as the polymer solution 0.25 gram of the polymer in 50 cubic centimeters of ethylene dichloride as the solvent. The efflux times are measured at 25° C. in a standard apparatus, sold under the designation of a modified Ostwald Viscometer.

Typical solvents and diluents which are used to prepare the acrylic polymer and the novel coating composition of this invention are toluene, xylene, butyl acetate, acetone, methylisobutyl ketone, methylethyl ketone, butyl alcohol, and other aliphatic cycloaliphatic and aromatic hydrocarbons, esters, ethers, ketones, and alcohols, such as are conventionally used in coating compositions.

About 0.1–4% by weight based on the weight of the monomer of a polymerization catalyst is used to prepare the acrylic polymer. Typical catalysts are ditertiary butyl peroxide, cumene hydroperoxide, azobisisobutyronitrile and the like.

The acrylic polymer contains about 0–25% by weight styrene and about 25–55% by weight methyl methacrylate. The polymer contains 38–48% of a soft constituent which is either an alkyl acrylate or an alkyl methacrylate in which the alkyl groups contain 2–4 carbon atoms. The following are typical monomers used as the soft constituent: ethyl acrylate, propyl acrylate, isopropylacrylate, butyl acrylate, isobutyl acrylate, ethyl methacrylate, propyl methacrylate, isopropyl methacrylate, butyl methacrylate and the like. Butyl acrylate is the preferred soft constituent since it forms a polymer that has excellent physical properties which are particularly desirable for the novel coating composition of this invention.

The acrylic polymer contains 5–20% by weight of a hydroxy containing compound. Typical useful hydroxy containing compounds are hydroxyalkyl acrylates or hydroxyalkyl methacrylates in which the alkyl groups contain 1–8 carbon atoms; for example, hydroxyethyl acrylate, hydroxypropyl acrylate, hydroxybutyl acrylate, hydroxyhexyl acrylate, hydroxyoctyl acrylate and the like, hydroxymethyl methacrylate, hydroxyethyl methacrylate, hydroxypropyl methacrylate, hydroxybutyl methacrylate, hydroxyhexyl methacrylate, hydroxyoctyl methacrylate and the like.

The acrylic polymer also contains about 1–5% by weight of an $\alpha,\beta$-unsaturated monocarboxylic acid. Typically useful $\alpha,\beta$-ethylenically unsaturated monocarboxylic acids used to prepare the acrylic polymer are acrylic acid, methacrylic acid, crotonic acid, ethacrylic acid, propylacrylic acid, isopropylacrylic acid and the like. Preferred are acrylic acid and methacrylic acid since these acids form a high quality polymer.

Preferably, the acrylic polymer used to form the novel coating composition of this invention contains 0–18% by weight styrene, 25–45% by weight methyl methacrylate, 40–43% by weight of an alkyl acrylate, or an alkyl methacrylate, having 2–4 carbon atoms in the alkyl groups 8–18% by weight of one of the aforementioned hydroxy containing constituents, 1–4% by weight of either acrylic acid or methacrylic acid.

One particularly useful acrylic polymer which gives a high quality coating contains 10–18% by weight styrene, 25–30% by weight methyl methacrylate, 38–42% by weight butyl acrylate, 10–16% by weight hydroxyethyl acrylate and 1–3% by weight acrylic acid.

Another particularly useful acrylic polymer contains 40–50% by weight methyl methacrylate, 40–48% by weight butyl acrylate, 6–10% by weight hydroxyethyl acrylate and 3–5% by weight acrylic acid.

Another useful acrylic polymer is shown in Belgian Patent 746,204 granted Aug. 18, 1970.

About 5–50% by weight, and preferably, about 10–30% by weight, based on the weight of the film-forming polymer blend of the coating composition, of cellulose acetate butyrate is used to form the novel coating composition of this invention. The cellulose acetate butyrate used in this invention has a butyryl content of about 45–55% by weight and has a viscosity of 1–6 seconds determined at 25° C. according to the method of ASTM-D-1343–56. Surprisingly, the cellulose acetate butyrate in the above amounts in the coating is miscible and compatible with the methacrylate polymer and forms excellent high quality coatings.

The other constituent of the novel coating composition of this invention is a heat reactive condensate which gives the composition its thermosetting characteristic and improves the composition's hardness, solvent resistance, alkali and heat resistance. About 5–50% by weight based on the weight of the film-forming polymer blend of the heat reactive condensate is used and preferably, about 10–25% by weight of the heat reactive condensate is used.

Preferred heat reactive condensate used to prepare the novel coating composition of the invention are alkylolated melamine formaldehyde resins or a mixture of an alkylolated melamine formaldehyde resin and urea formaldehyde. These preferred alkylolated melamine formaldehyde resins have 1–4 carbon atoms in the alkyl group and are those that are well known in the art. These resins are prepared by conventional techniques in which a lower alkyl alcohol such as methanol, ethanol, butanol, isobutanol, propanol, isopropanol and the like is reacted with the melamine formaldehyde resin to provide pendent alkoxy group or groups. In general, other melamine formaldehyde resins that are methylolated and have 3–6 methylol groups are useful in the invention. Acid catalysts can be used with the highly alkylolated melamine formaldehyde resins to reduce the curing temperature of the composition. One preferred melamine resin used in this invention, because of its availability and since it forms a high quality coating composition, is an essentially monomeric, partially methylolated melamine formaldehyde. One resin of this type has a molar ratio of melamine/formaldehyde/methanol of about 1/5/3. Another useful resin is hexamethoxymethylol melamine.

Sucrose benzoate can be used in the novel coating composition of this invention in amounts of about 2–10% by weight, based on the weight of the film-forming material of this novel coating composition.

Plasticizers can be used in the novel coating composition of this invention in amounts up to 20% by weight of the film-forming material. Preferably, about 3–8% by weight of a plasticizer is used. Functional polymeric plasticizers which react with the constituents in the coating composition can be used, such as epoxidized soya bean oil, oil free and oil modified alkyds and polyesters, such as, polyorthophthalate esters, polyalkylene adipate esters or polyarylene adipate esters.

Volatile non-functional monomeric plasticizers can also be used, such as butylbenzyl phthalate, dibutyl phthalate, triphenyl phosphate, 2-ethylhexylbenzyl phthalate, dicyclohexyl phthalate, dibenzyl phthalate butylcyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl, butyl glycolate, acetyltributyl citrate, dibenzyl sebacate, tricresyl phosphate, toluene ethyl sulfonamide, the di-2-ethylhexyl ester of hexamethylene diphthalate, di(methylcyclohexyl) phthalate.

Pigments are used in the novel coating composition of this invention in the amounts of 0.1–20.0% pigment volume concentration, preferably, a pigment volume concentration of about 0.3–6.0% is used. Examples of the great variety of pigments which are used in the novel coating composition of this invention are metallic oxides, preferably titanium dioxide, zinc oxide, and the like, metal hydroxides, metal flakes, metal powders, chromates, such as lead chromate, sulfides, sulfates, carbonates, carbon black, silica, talc, china clay, iron blues, organic reds, maroons, organic dyes, lakes, and the like.

The novel coating compositions of this invention can be applied to a variety of substrates, for example, wood, glass, plastics, such as polypropylene, styrene, copolymers of styrene and the like, by any of the usual application methods, such as spraying, electrostatic spraying, dipping, brushing, flow coating and the like. These coatings can be air dried or can be baked which minimizes the drying period. The resulting coating is about 1–5 mils thick, preferably 1–3 mils thick and can be rubbed or polished in accordance with conventional techniques, if desired, to improve smoothness or apparent gloss or both.

The novel coating compositions of this invention can be applied by electrostatic spraying. A standard electrostatic spray gun can be used such as a Ransburg gun, DeVilbiss gun, Binks gun or a Nordson gun. The gun can be externally or internally charged. Typical conditions that can be used to spray the novel composition are, for example, voltage 20,000–120,000 volts, 1–100 microamps, gun pressure 20–80 pounds per square inch, fluid flow 10–40 ounces per minute, atomization air pressure 50–100 pounds per square inch.

Preferably, the novel coating composition of this invention is applied over a suitably primed metal substrate. Typical alkyd primers or epoxy primers pigmented with iron oxide, carbon black, titanium dioxide and the like can be used. Also, the novel composition can be used directly over galvanized steel to form a durable coating.

One advantage of the novel coating composition of this invention is that the composition can be applied directly over a primer coating without the use of an intermediate sealer coat. However, a sealer coat can be used to provide coatings with excellent adhesion and smoothness. Typically useful sealer compositions are disclosed in Rohrbacher U.S. 3,509,086, issued Apr. 28, 1970.

After the novel coating composition is applied, the coating preferably is cured at about 125–175° C. for about 15–30 minutes. By the addition of conventional catalyst to the novel composition, the curing temperature can be reduced to 80–110° C. Typical catalysts that can be used are butyl acid phosphate, paratoluene sulfonic acid and the like.

The dried coatings of the compositions of this invention are characterized by increased freedom from water spotting and have excellent craze resistance in combination with outstanding durability and gloss retention. Coatings of this invention also have good gasoline resistance and resistance to aromatic solvents and improved adhesion to metal substrates as compared with conventional acrylic enamels.

Coating compositions of this invention find particular utility in coating articles such as in the auto industry which are mass produced. Also, the coating compositions of this invention now make it possible to blend refinished spots with adjacent or overlapping areas which has not been possible with prior art acrylic enamels.

The following examples illustrate this invention. The parts and percentages are by weight unless otherwise specified.

EXAMPLE 1

A coating composition is formed by first preparing the following polymer A solution:

Portion 1: Parts by weight
  Hydrocarbon solvent (boiling point 150–190° C., aniline point −28° C.) _____ 1537
  Butyl alcohol _____ 615
  Ethylene glycol monoethyl ether acetate ____ 830
Portion 2:
  Styrene monomer _____ 738
  Methyl methacrylate monomer _____ 1245
  Butyl acrylate monomer _____ 1845
  Hydroxyethyl acrylate monomer _____ 680
  Acrylic acid monomer _____ 105
  Ditertiary butyl peroxide _____ 92
Portion 3:
  Butyl acetate (90% n-butyl acetate in 10% butyl alcohol) _____ 698

Total _____ 8385

Portion 1 is premixed and then charged into a reaction vessel equipped with a stirrer, a thermometer and a heating element and the ingredients are heated to 130° C. Portion 2 is premixed and then added to the reaction mixture and the reaction mixture is heated to its reflux temperature of about 135° C. and held at this temperature for about 3.5 hours. Portion 3 is then added and thoroughly mixed with the reaction mixture. The resulting polymer A solution has a polymer solids content of 55% and a Gardner Holdt viscosity measured at 25° C. of about W to Y. The resulting polymer A has the following composition: styrene/methyl methacrylate/butyl acrylate/hydroxyethyl acrylate/acrylic acid in a weight ratio of 16/27/40/14.5/2.5.

The polymer has an acid number of about 16–20, a glass transition temperature of about 32° C. and a relative viscosity of about 1.09 measured in ethylene dichloride at 25° C. measured according to ASTM–D–445–46–T Method B.

Resin A solution is prepared by blending Polymer A solution with a melamine resin as follows:

Parts by weight
Polymer A solution (55% polymer solids) _____ 1626
Melamine resin solution (70% resin solids in which the resin is a partially methylolated melamine formaldehyde resin, molar ratio of melamine/formaldehyde/methanol 1.0/5.1/2.8) _____ 538
Butyl alcohol _____ 140
Hydrocarbon solvent (described above) _____ 896

Total _____ 3200

The resulting Resin A solution has a solids content of about 40% by weight.

A pigment dispersion Y is formulated by blending the following ingredients:

Parts by weight
Aluminum paste (65.5% solids of finely divided aluminum dispersed in mineral spirits) _____ 23.2
Copolymer solution (55% polymer solids in a solvent mixture of butyl alcohol, butyl acetate, ethylene glycol monoethyl ether acetate and a hydrocarbon solvent (described above) in which the copolymer is styrene/methyl methacrylate/butyl acrylate/hydroxyethyl acrylate/acrylic acid in a weight ratio of 16/27/40/14.5/2.5) __ 55.5
Xylol _____ 21.3

Total _____ 100.0

Coating Compositions A, B and C are prepared by blending the following ingredients (parts by weight basis):

|  | A | B | C |
|---|---|---|---|
| Resin A solution (40% solids) | 159 | 159 | 159 |
| Pigment dispersion Y (prepared as above) | 23 | 25 | 27 |
| Cellulose acetate butyrate solution[1] | 15 | 32 | 64 |
| Solvent (toluene/isopropyl alcohol ration of 5/1) | 100 | 110 | 120 |
| Total | 298 | 326 | 270 |

[1] 27.5% CAB solids in a 2:1 toluene/acetone solvent mixture, the CAB has a 1 sec viscosity measured at 25% polymer solids in a solution of acetone and toluene according to ASTM D–1343–56 and butyryl content of the CAB 53%.

Each of the above prepared coating compositions is reduced to a spray viscosity with a conventional thinner and each is sprayed onto a steel panel primed with a 1.5 mil thick iron oxide pigmented epoxidized resin primer. Each panel is backed for about 30 minutes at 150° C. and results in a hard fully cured film about 1.8 mils thick which in each case has a high gloss, excellent hardness, is resistant to blistering by high humidity, has excellent resistance to water soaking, highly chip resistant, resistant to solvents and resistant to deterioration by weathering.

EXAMPLE 2

The following coating composition is formed by first preparing polymer B solution:

Portion 1: Parts by weight
  Hydrocarbon solvent (described in Example 1) _____ 1891
  Ethylene glycol monoethyl ether acetate _____ 1162
  Butyl alcohol _____ 231
Portion 2:
  Methyl methacrylate monomer _____ 2321
  Butyl methacrylate monomer _____ 2220
  Hydroxyethyl acrylate monomer _____ 420
  Acrylic acid _____ 200
  Ditertiary butyl peroxide _____ 155

Total _____ 8600

Portion 1 is premixed and charged into a reaction vessel as described in Example 1 and heated to about 130° C. Portion 2 is then premixed and charged into the reaction vessel and the ingredients are heated to the reflux temperature of 135° C. for about 3.5 hours. The resulting polymer B solution has a polymer solids content of about 60% and a Gardner Holdt viscosity of about Z to $Z_2$ measured at 25° C.

The resulting polymer B has the following composition: methyl methacrylate/butyl acrylate/hydroxyethyl acrylate/acrylic acid in a weight ratio of 45/43/8/4. The polymer has an acid number of 25–30, a glass transition temperature of about 16° C. and a relative viscosity of about 1.07 measured in ethylene dichloride solvent at 25° C. and according to ASTM D-445-46-T, Method B.

Resin B solution is prepared by blending polymer A solution with a melamine resin as follows:

| | Parts by weight |
|---|---|
| Polymer B solution (60% solids) | 1498 |
| Melamine resin solution (70% solids described in Example 1) | 538 |
| Butyl alcohol | 154 |
| Hydrocarbon solvent (described in Example 1) | 1010 |
| Total | 3200 |

The resulting resin solution has a polymer solids content of about 40% by weight.

Coating Compositions D, E and F are prepared by blending the following ingredients (parts by weight basis):

| | D | E | F |
|---|---|---|---|
| Resin B solution (40% polymer solids) | 159 | 159 | 159 |
| Pigment dispersion Y (described in Example 1) | 23 | 25 | 27 |
| Cellulose acetate butyrate solution (described in Example 1) | 16 | 32 | 64 |
| Solvent—toluene/isopropyl alcohol, ratio of 5/1 | 100 | 110 | 120 |
| Total | 298 | 326 | 370 |

Each of the above prepared coating compositions is diluted to a spray viscosity using a conventional thinner and each is sprayed onto a steel panel primed with a 1.5 mil thick iron oxide pigmented epoxidized resin primer. Each panel is baked for about 30 minutes at 150° C. and results in a hard fully cured film about 1.8 mils thick which in each case has a high gloss, excellent hardness, is resistant to blistering by high humidity, has excellent resistance to water soaking, highly chip resistant, resistant to solvents and resistant to deterioration by weathering.

EXAMPLE 3

A coating composition is prepared by blending the following ingredients:

| | Parts by weight |
|---|---|
| Polymer B solution (60% solids, prepared in Example 2) | 117 |
| Hexamethoxymethylol melamine solution (77% solids in methanol) | 39 |
| Cellulose acetate butyrate solution (27.5% solids described in Example 1) | 80 |
| Sucrose benzoate solution (70% solids in toluene/acetone solvent mixture) | 17 |
| Total | 253 |

The above prepared coating composition is diluted to a spray viscosity using a conventional thinner and is sprayed onto a steel panel primed with a 1.5 mil thick iron oxide pigmented epoxidized resin primer. The panel is baked for about 30 minutes at 150° C. and results in a hard fully cured film about 1.8 mils thick which has a high gloss, excellent hardness, is resistant to blistering by high humidity, has excellent resistance to water soaking, highly chip resistant, resistant to solvents and resistant to deterioration by weathering.

EXAMPLE 4

Coating Composition F prepared in Example 2 is electrostatically sprayed onto a primed steel panel. The panel is primed with 1.5 mil thick coating of an epoxidized alkyd resin primer pigmented with iron oxide. Coating Composition F is reduced about 25% by volume with xylol to a spray viscosity of 23 seconds No. 2 Zahn cup at 25° C.

A Ransburg Electric Air Gun externally charged is used. The following spraying conditions are used:

Gap—high delivery
Fan width—12 inches
Lap—4 inches
Gun distance—11 inches
Speed of spray—3.0 feet per second
Fluid pressure—55/50 pounds per square inch
Fluid flow—840 cubic centimeters per minute
Air pressure—95 pounds per square inch Three coats are applied using the above spray conditions with 2½ minutes between coats. The panel is baked for about 30 minutes at 150° C. and results in a hard, fully cured film about 2 mils thick which has a high gloss, excellent hardness, is resistant to blistering by high humidity, has excellent resistance to water soaking, highly chip resistant, resistant to solvents and resistant to deterioration by weathering.

EXAMPLE 5

A coating composition is prepared by blending the following ingredients:

| | Parts by weight |
|---|---|
| Portion 1: | |
| Polymer B solution (60% solids, prepared in Example 2) | 4,237 |
| Melamine resin solution (70% solids, described in Example 1) | 1,483 |
| Cellulose acetate butyrate solution (described in Example 1) | 2,331 |
| Butyl benzyl phthalate | 254 |
| Xylol | 1,441 |
| Anhydrous isopropyl alcohol | 254 |
| Portion 2: | |
| Pigment dispersion Y (prepared in Example 1) | 1,000 |
| Total | 11,000 |

Portion 1 is thoroughly mixed and then Portion 2 is added and thoroughly blended with Portion 1. The resulting coating composition has a pigment to binder content of 3:100.

The above prepared coating composition is reduced to a spray viscosity using a conventional thinner and sprayed onto a steel panel primed with an alkyd primer pigmented with carbon black. The panel is baked for about 30 minutes at 150° C. and results in a hard, fully cured film about 1.8 mils thick which has a high gloss, excellent hardness, is resistant to blistering by high humidity, has excellent resistance to water soaking, highly chip resistant, resistant to solvents and resistant to deterioration by weathering.

I claim:
1. A liquid coating composition comprising 10–60% by weight of a film-forming polymer blend and a solvent for said polymer blend wherein said polymer blend consists essentially of
    (1) 50–80% by weight, based on the weight of the polymer blend, of an acrylic polymer which consists essentially of
        (a) 0–25% by weight styrene,
        (b) 25–55% by weight methyl methacrylate,
        (c) 38–48% by weight of a soft constituent selected from the group consisting of an alkyl acrylate and an alkyl methacrylate wherein the alkyl groups have 2–4 carbon atoms;
        (d) 5–20% by weight of a hydroxy containing constituent selected from the group consisting of a hydroxy alkyl methacrylate and a hydroxy alkyl acrylate wherein the alkyl group contain 1–8 carbon atoms; and

(e) 1–5% by weight of an α,β-unsaturated monocarboxylic acid;
wherein said acrylic polymer has a relative viscosity of 1.04–1.10 measured at 25° C. in ethylene dichloride according to ASTM D–445–46T, Method B;
(2) 5–50% by weight, based on the weight of the polymer blend, of cellulose acetate butyrate having butyryl content of about 45–55% by weight and a viscosity at 25° C. of about 1–6 seconds measured according to ASTM–D–1343–56;
(3) 5–50% by weight based on the weight of the polymer, of a melamine formaldehyde resin which has been at least partially reacted with an aliphatic monohydric alcohol having from 1–4 carbon atoms.

2. The coating composition of claim 1 which contains pigment in a pigment volume concentration of about 1 to 20% by weight and has a polymer solids content of 30–50% by weight.

3. The coating composition of claim 2 which contains up to 20% by weight, based on the weight of the film-forming polymer blend, of an organic plasticizer.

4. The coating composition of claim 2 in which the acrylic polymer has a relative viscosity of 1.06–1.09.

5. The coating composition of claim 4 in which the α,β-ethylenically unsaturated monocarboxylic acid is selected from the group consisting of acrylic acid and methacrylic acid.

6. The coating composition of claim 4 in which the acrylic polymer consists essentially of 10–18% by weight styrene, 25–30% by weight methyl methacrylate, 38–42% by weight butyl acrylate, 10–16% by weight hydroxyethyl acrylate and 1–3% by weight acrylic acid.

7. The coating composition of claim 4 in which the acrylic polymer consists essentially of 40–50% by weight methyl methacrylate, 40–48% by weight butyl acrylate, 6–10% by weight hydroxyethyl acrylate, 3–5% by weight acrylic acid.

8. The coating composition of claim 1 which comprises 30–50% by weight of a film-forming polymer blend and a solvent for said polymer blend wherein said polymer blend consists essentially of
(1) 55–70% by weight, based on the weight of the polymer blend, of an acrylic polymer which consists essentially of
  (a) 0–18% by weight styrene,
  (b) 25–45% by weight methyl methacrylate,
  (c) 40–43% by weight of an alkyl acrylate in which the alkyl group has 2–4 carbon atoms;
  (d) 8–18% by weight of a hydroxy containing constituent selected from the group consisting of a hydroxy alkyl acrylate and a hydroxy alkyl methacrylate, wherein the alkyl groups have 2–4 carbon atoms;
  (e) 1–4% by weight of an α,β-unsaturated monocarboxylic acid selected from the group consisting of acrylic acid and methacrylic acid,
wherein the acrylic polymer has a relative viscosity of 1.06–1.09;
(2) 10–30% by weight of cellulose acetate butyrate having a butyryl content of about 45–55% by weight and a viscosity at 25° C. of about 1–6 seconds,
(3) 10–25% by weight of an alkylolated melamine formaldehyde resin in which the alkyl group has 1–4 carbon atoms.

9. The coating composition of claim 8 in which the alkylolated melamine formaldehyde resin is hexamethoxymethylol melamine.

10. The coating composition of claim 8 in which the alkylolated melamine formaldehyde resin is a methylolated melamine formaldehyde resin in which the molar ratio of melamine/formaldehyde/methanol is 1/5/3.

11. The coating composition of claim 8 containing 3–8% by weight, based on the weight of the polymer blend, of butylbenzylphthalate.

12. A metal substrate coated with a 0.1–5 mil dried coalesced layer of the coating composition of claim 1.

13. A ferrous metal substrate having a pigmented primer layer coated with a 1–5 mil dried coalesced layer of the coating composition of claim 1.

14. A plastic substrate reinforced with glass fibers coated with a 1–5 mil dried coalesced layer of the coating composition of claim 1.

References Cited
UNITED STATES PATENTS

| | | | |
|---|---|---|---|
| 2,681,897 | 6/1954 | Frazier | 260—851 |
| 2,849,409 | 8/1958 | Evans | 260—16 |
| 3,311,583 | 3/1967 | Bearden | 260—80.75 |
| 3,338,860 | 8/1967 | Vasta | 260—80.75 |
| 3,365,414 | 1/1968 | Fisk et al. | 260—33.4 |
| 3,370,025 | 2/1968 | Salo et al. | 260—16 |
| 3,411,941 | 11/1968 | Lowe et al. | 260—15 |

FOREIGN PATENTS

| | | | |
|---|---|---|---|
| 939,211 | 10/1963 | Great Britain | 260—80.75 |

OTHER REFERENCES

Paint Technology, "Practical . . . Acrylic Resins," Stewart, July 1966, pp. 19–20, 23–26 and 28–31.

WILLIAM H. SHORT, Primary Examiner

E. WOODBERRY, Assistant Examiner

U.S. Cl. X.R.

117—74, 127, 138.8 B, 147; 260—31.6